United States Patent [19]
Grancher

[11] Patent Number: 5,533,551
[45] Date of Patent: Jul. 9, 1996

[54] PRESSURE REGULATING SERVOVALVE

[75] Inventor: Raymond Grancher, Bonneval, France

[73] Assignee: L'Hydraulique Chateaudun, France

[21] Appl. No.: 375,411

[22] Filed: Jan. 18, 1995

[30] Foreign Application Priority Data

Jan. 21, 1994 [FR] France .................................. 94 00649

[51] Int. Cl.⁶ ................................................ F15B 13/043
[52] U.S. Cl. ................................. 137/625.62; 137/625.64; 251/50
[58] Field of Search ......................... 137/625.62, 625.64; 251/50

[56] References Cited

U.S. PATENT DOCUMENTS

| | | |
|---|---|---|
| 3,286,734 | 11/1966 | Hartshorne . |
| 3,443,594 | 5/1969 | Frayer . |
| 3,856,047 | 12/1974 | Takayama ..................... 137/625.64 X |
| 3,983,908 | 10/1976 | Bartholomaeus .................. 137/625.62 |
| 4,316,599 | 2/1982 | Bouvet et al. ......................... 251/50 X |
| 4,321,941 | 3/1982 | Hunschede et al. ........... 137/625.64 X |

FOREIGN PATENT DOCUMENTS

| | | |
|---|---|---|
| 0186221 | 7/1986 | European Pat. Off. . |
| 2826125 | 12/1978 | Germany . |
| 2255840 | 11/1992 | United Kingdom . |

*Primary Examiner*—Gerald A. Michalsky
*Attorney, Agent, or Firm*—Sixbey, Friedman, Leedom & Ferguson; Gerald J. Ferguson, Jr.; Tim L. Brackett, Jr.

[57] ABSTRACT

It comprises a distributor body having an output port, a feed port and a return port, and a slider adapted to slide inside the distributor body between a first position isolating the output port from the feed and return ports, a second position connecting the output port to the feed port and a third position connecting the output port to the return port. The slider co-operates with the distributor body to define two pilot chambers fed with a pilot fluid, an output chamber is connected to the output port by an output passage, and a damper chamber in the distributor body includes mechanical means for reducing its hydraulic stiffness and connected to the output port via a damper passage including a calibrated orifice.

8 Claims, 3 Drawing Sheets

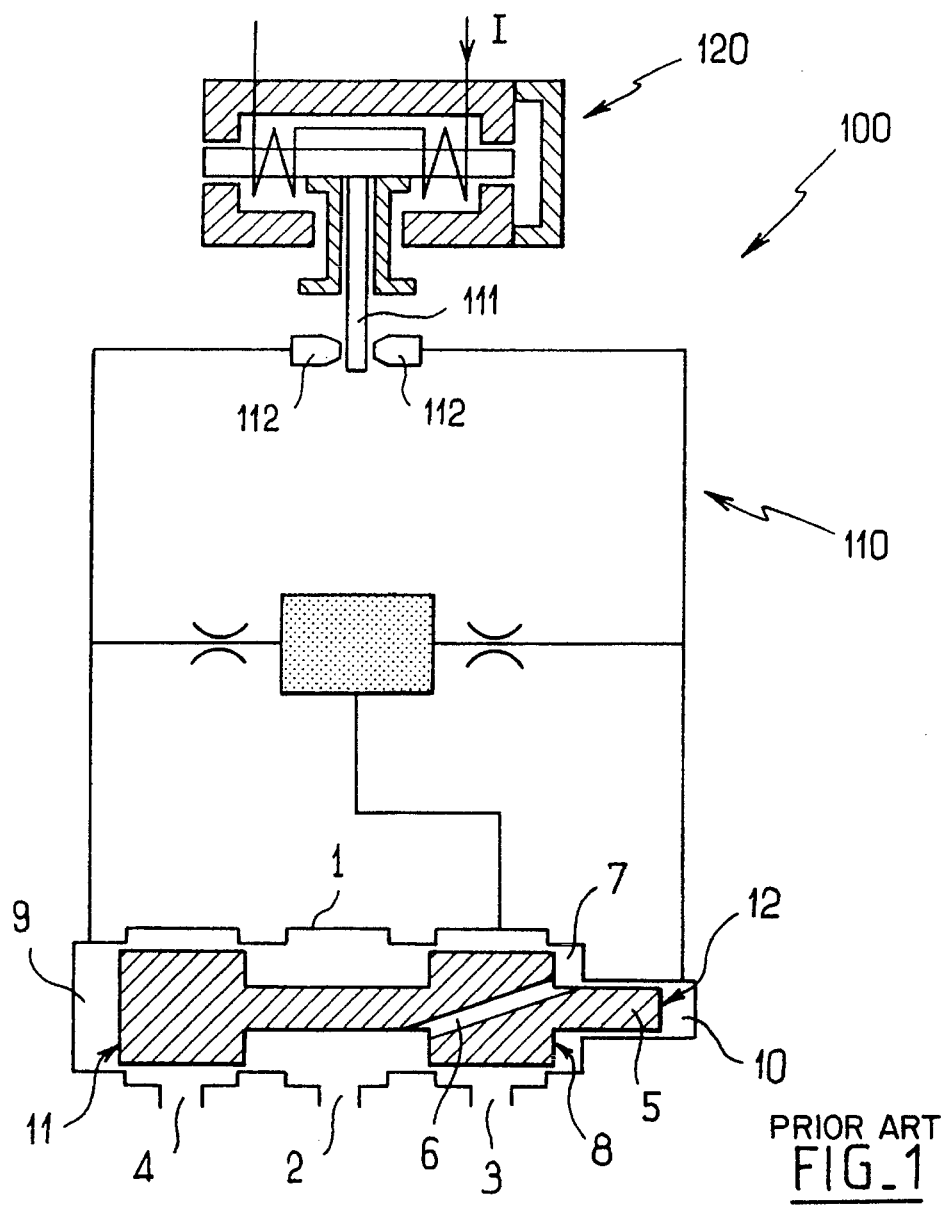
PRIOR ART
FIG_1
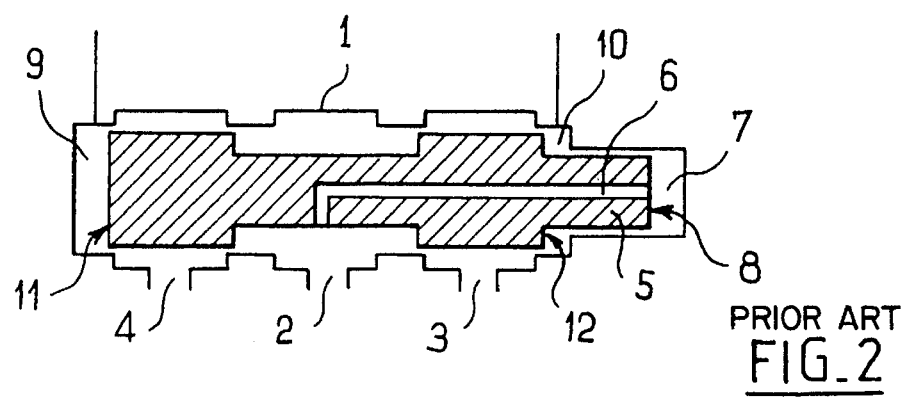
PRIOR ART
FIG_2

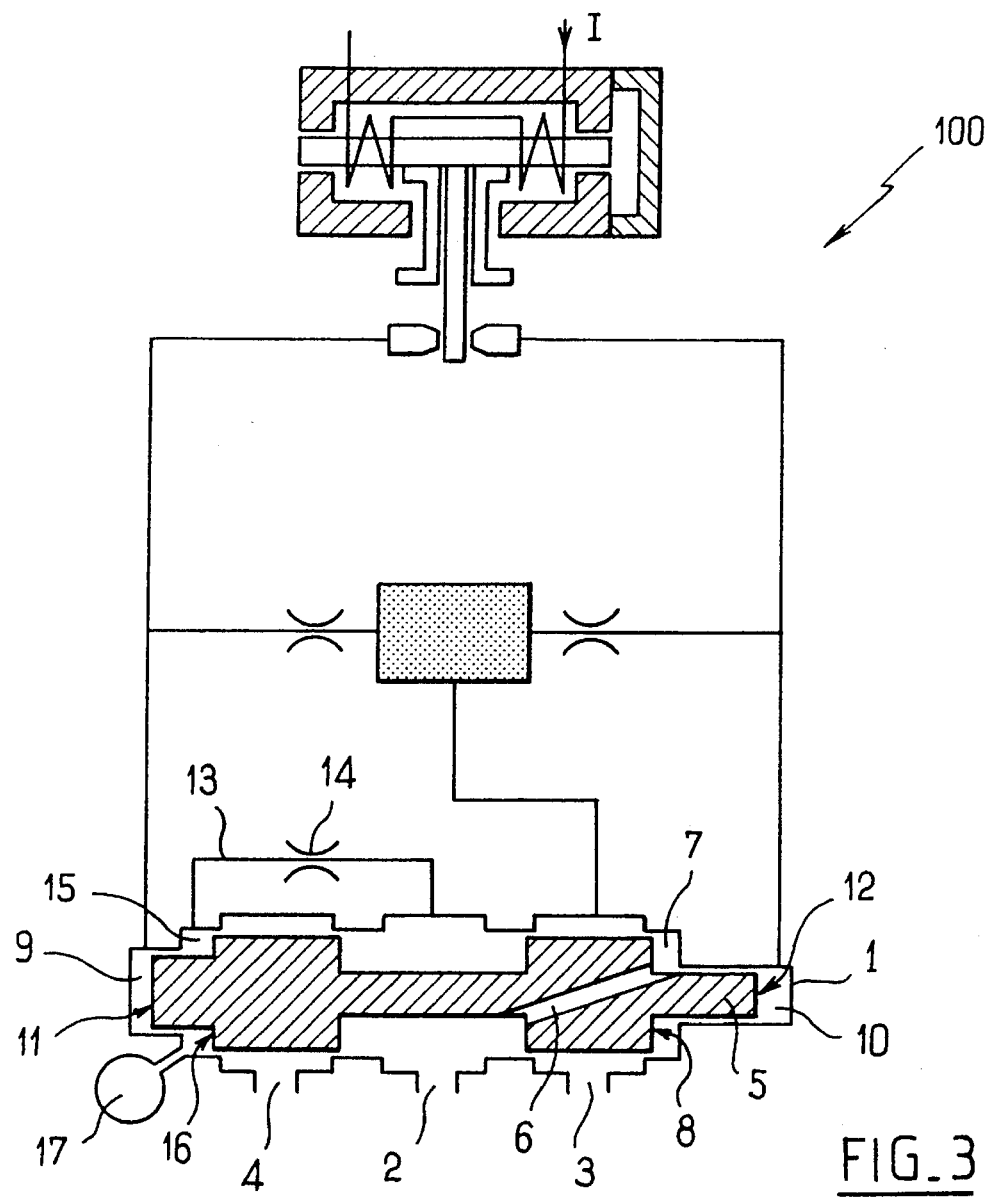
FIG_3
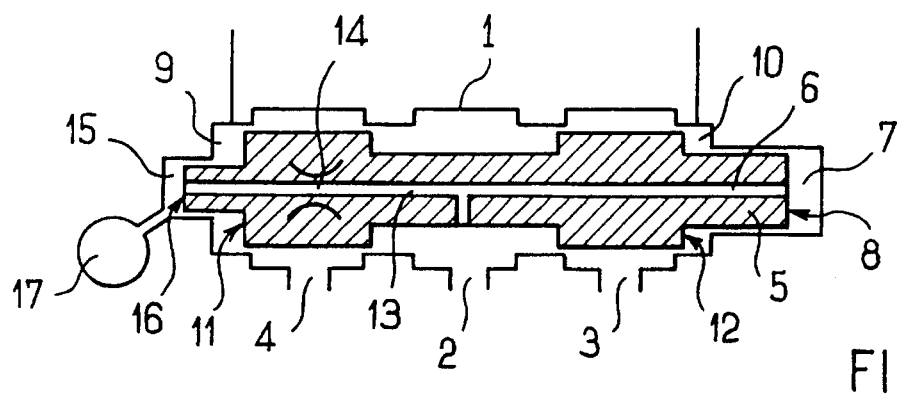
FIG_4

PRESSURE REGULATING SERVOVALVE

The present invention concerns a pressure-regulating servovalve used in aircraft brake circuits, for example.

BACKGROUND OF THE INVENTION

A pressure-regulating servovalve (also called a pressure servoregulator) is a device that converts an electrical input signal, usually a control current, into a hydraulic output signal in the form of a servo-controlled pressure in an output circuit.

One of the widest applications of pressure-regulating servovalves in aviation lies in controlling the pressure in aircraft hydraulic brake circuits. Three-way pressure-regulating servovalves are used in which a slider connects an output port alternately to a feed port or to a return port according to whether the pressure at the output port (also called the output pressure) is below or above a required pressure. The slider is moved by the pressures in two pilot chambers fed with pressurized fluid from a pilot unit and acting on the slider in opposite directions and by the output pressure which feeds an output chamber connected to the output port. The pilot unit is an electro-hydraulic amplifier comprising an electric torque motor driving a moving mechanical member in proportion to the torque motor control current. The mechanical member is often a vane disposed between two nozzles facing in opposite directions, but it can comprise any other system which by moving creates two pressures such that the difference between them is proportional to the torque motor control current. The resulting pressures constitute the pressures in each of the pilot chambers of the slider and are called the pilot pressures. To regulate the pressure to the required value (called the servo-control pressure) the torque motor control current is varied to vary the slider pilot pressures, the resultant force of which opposes the resultant force of the output pressure. If the pressure in the output chamber is too low the slider moves to connect the output port to the feed port in order to increase the output pressure; if the output pressure is too high the slider moves to connect the output port to the return port, so that the output pressure falls. The slider returns to an equilibrium position, i.e. isolates the output port, as soon as the output pressure reaches the servo-control pressure.

In such pressure-regulating servovalves the output pressure is applied directly to the slider. The slider responds immediately to any sudden changes in this pressure, with the result that the response time of the system is good but pressure control can be unstable.

The distance of the servovalve from the unit whose pressure it regulates requires a large volume of fluid in the pipes, leading to resonant frequencies which are low, sometimes as low as a few Hz. It is then necessary to increase the inherent damping properties of the servovalve without compromising its response time.

OBJECTS AND SUMMARY OF THE INVENTION

The main object of the invention is to improve the stability of the servovalve while optimizing its response time.

To this end the invention provides a pressure-regulating servovalve comprising a distributor body having an output port, a feed port and a return port, and a slider adapted to slide inside the distributor body between a first position isolating the output port from the feed and return ports, a second position connecting the output port to the feed port and a third position connecting the output port to the return port. The slider co-operates with the distributor body to define two pilot chambers fed with a pilot fluid from a pilot unit and an output chamber connected to the output port by an output passage. According to the invention, a damper chamber is provided in the distributor body. It includes mechanical means for reducing its hydraulic stiffness and is connected to the output port via a damper passage including a calibrated orifice.

Accordingly, the provision of a damper chamber reducing the hydraulic stiffness of the pressure feedback system formed by the output chamber leads to progressive variation in the pressure of the fluid in the damper chamber as the result of transfer of fluid through the calibrated orifice. This transfer between the output chamber and the damper chamber introduces into the feedback system a damping effect opposing uncontrolled oscillation of the fluid and the slider.

The calibrated orifice also increases the feedback force on the slider during the transient conditions caused by its displacement, thereby reducing the response time. If the output pressure varies the damper chamber pressure varies by the same amount, but more slowly, as the result of transfer of fluid between the output chamber and the damper chamber via the calibrated orifice. As the variation in the pressure in the damper chamber is delayed relative to that of the output pressure, the pressure in the damper chamber is lower than the output pressure when the latter is increasing, and vice versa. The feedback force on the slider is increased compared to that under steady state conditions, in which the output pressure is equal to the damper chamber pressure.

BRIEF DESCRIPTION OF THE DRAWINGS

Other features and advantages of the invention will emerge from a reading of the following description of specific and non-limiting embodiments of the invention. It refers to the appended figures, in which:

FIG. 1 is a diagrammatic sectional view of a conventional servovalve and its pilot unit;

FIG. 2 is a diagrammatic sectional view of another conventional servovalve;

FIG. 3 is a view similar to FIG. 1 of a first embodiment of servovalve in accordance with the invention;

FIG. 4 is a view similar to FIG. 2 of a second embodiment of servovalve in accordance with the invention;

MORE DETAILED DESCRIPTION

Figure 5:
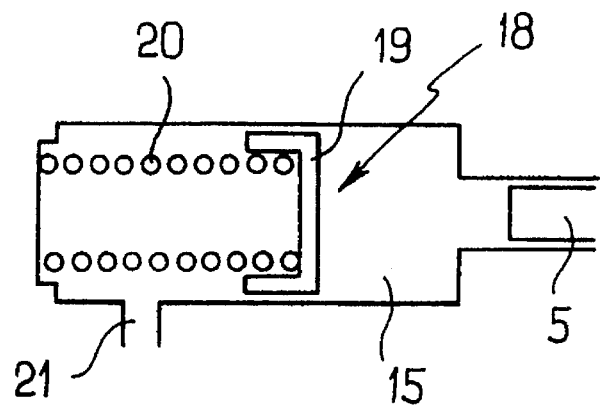
FIGS. 5 through 8 show variants of the damper chamber and its mechanical means for reducing its hydraulic stiffness.

Referring to FIGS. 1 and 2, each of the conventional pressure-regulating servovalves shown comprises a distributor body 1 having an output port 2, a feed port 3 and a return port 4. A slider 5 slides inside the distributor body 1 between a first position isolating the output port 2 from the feed and return ports, a second position connecting the output port 2 to the feed port 3, and a third position connecting the output port 2 to the return port 4.

The output port 2 is connected by an output passage 6 to an output chamber 7 in the distributor body 1 facing a radial output section 8 of the slider 5. Two pilot chambers 9 and 10 in the distributor body 1 face respective radial pilot sections 11 and 12 on the slider 5. The radial pilot sections 11 and 12 face in opposite directions.

The pilot chambers are fed with pressurized fluid from a pilot unit 100 such as a hydraulic potentiometer 110 fed by a torque motor 120. In a system like this the torque motor is fed a control current (I). It moves the vane 111 of the hydraulic potentiometer which is disposed between two mutually facing nozzles connected by a pipe to the pilot chambers 9 and 10 in the distributor body 1. The position of the vane 111 controls the relative pressure at each nozzle 112, these pressures constituting pilot pressures for the slider 5. Accordingly, for a given control current there is a given pilot pressure in the pilot chamber 9 and a given pilot pressure in the pilot chamber 10. These pilot pressures operate on the slider 5 in opposite directions and the resultant force on the slider depends directly on the torque motor control current.

When the servovalve is activated, the output port 2, which is connected to an external unit such as a brake cylinder (not shown) is exposed to an output pressure which propagates as far as the output chamber 7 via the output passage 6 and therefore acts on the slider 5 in opposition to the resultant force due to the pilot pressures.

Under steady state conditions, the slider 5 is in equilibrium and remains in the position in which it isolates the output port. The forces due to the output pressure and the pilot pressures cancel out and, as the pilot pressures vary with the control current I, the output pressure is also directly dependent on the control current. This results in pressure control in compliance with the control current, the resulting output pressure under steady state conditions being called the servo-control pressure. The forces exerted on the slider by the pilot pressures depend on the required servo-control pressure and the radial output section 8.

Under dynamic conditions, with the control current varying because a user requires a different servo-control pressure or because the output pressure at the output port varies due to the direct effect of a variation in the load on the external unit, the forces exerted on the slider 5 by the output and pilot pressures no longer cancel out. If the output pressure is greater than the servo-control pressure, the force exerted on the radial output section 8 of the slider 5 by the output pressure is greater than the resultant force due to the action of the pilot pressures on the radial pilot sections 11 and 12; the slider then moves to a position connecting the output port 2 to the return port 4 and the output pressure falls until it is equal to the servo-control pressure. The slider is then pushed back to the position isolating the output port. Conversely, if the output pressure is less than the servo-control pressure the slider 5 moves to a position connecting the output port 2 to the feed port 3 and is then pushed back when the output pressure is equal to the servo-control pressure.

In this conventional type of servovalve the output pressure is applied directly to the slider which therefore reacts instantaneously to variations in the output pressure, which is beneficial in terms of speed of response, but can compromise the stability of pressure control.

Referring to FIGS. 3 and 4, to remedy this instability a damper chamber 15 is formed in the distributor body 1 facing a radial damper section 16 of the slider 5 facing the opposite way to the radial output section 8. This chamber communicates with the output chamber 7 via a damper passage 13 in the distributor body 1 (see FIG. 3) or in the slider 5 (see FIG. 4). This damper passage includes a calibrated orifice 14 and the damper chamber 13 is at a pressure called the damping pressure.

Referring to FIGS. 5 through 8, the damper chamber 15 includes mechanical means 18 for reducing its hydraulic stiffness. The mechanical means 18 include a moving wall and return spring means for the latter, so that the damper chamber 15 defines with the moving wall a damper volume 17 varying linearly with the damping pressure. These mechanical means can be implemented in various ways.

In a first embodiment of the mechanical means, shown in FIG. 5, a piston 19 coupled to a spring 20 slides in the damper chamber 15 which has a port 21 at the end remote from the damper passage 13.

Figure 6:
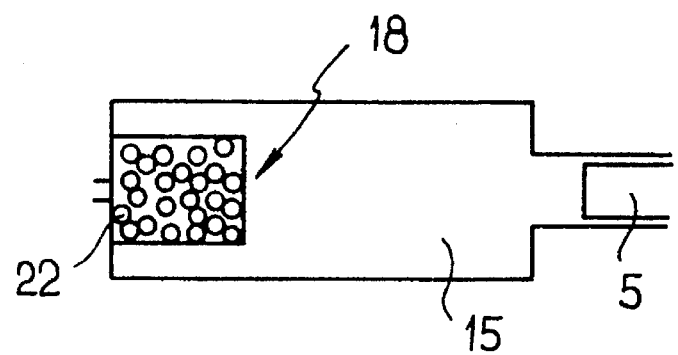

In a second embodiment, shown in FIG. 6, a composite compressible member 22 is disposed inside the damper chamber 15.

Figure 7:
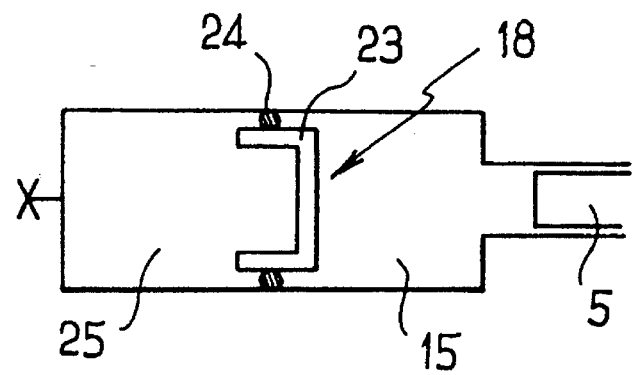

In a third embodiment, shown in FIG. 7, a piston 23 with a seal 24 at its periphery slides inside the damper chamber 15, separating a pressurized neutral gas volume 25 from the damper volume 17.

Figure 8:
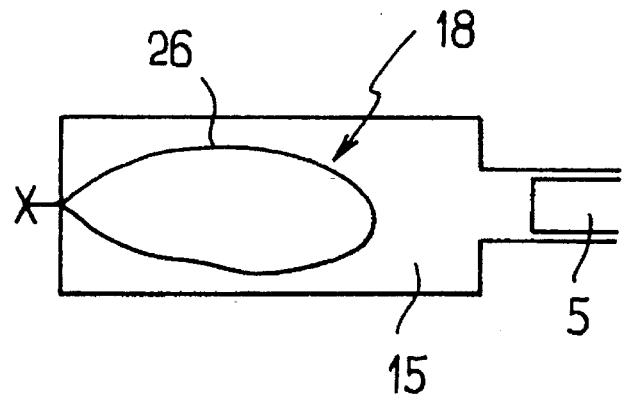

In a fourth embodiment, shown in FIG. 8, a membrane 26 containing a volume 27 of pressurized neutral gas is disposed inside the damper chamber 15.

When the servovalve is activated the output port 2 is at an output pressure which propagates to the output chamber 7 via the output passage 6 and therefore acts on the slider 5 in the direction opposite to the force resulting from the action of the pilot pressures.

Under steady state conditions the pressure in the damper chamber is equal to the output pressure and its action on the slider 5 opposes that of the output pressure. The forces exerted by the output pressure on the radial output and damper sections 8 and 16 of the slider 5 oppose each other. The resultant of these forces and that of the forces exerted by the pilot pressures on the radial pilot sections 11 and 12 cancel out and the slider 5 remains in the position isolating the output port 2. It is therefore the difference between the radial output and damper sections 8 and 16 that must be taken into account in determining the force exerted on the slider 5 by the output pressure and thus the forces exerted on the slider by the pilot pressures as a function of the required servo-control pressure.

Under dynamic conditions, if the output pressure varies relative to the servo-control pressure because the load on the external unit varies, the slider 5 moves away from its equilibrium position isolating the output port, and connects the output port 2 to the feed port 3 if the output pressure has to increase or to the return port 4 if the output pressure has to decrease.

Upon such variation the output chamber 7 is immediately exposed to the new pressure but the pressure in the damper chamber 15 increases or decreases progressively due to the variation in the damper volume 17 allowed by the mechanical means 18 for reducing the hydraulic stiffness of the damper chamber 15 and by the head loss at the calibrated orifice 14 on transfer of fluid between the output chamber and the damper chamber. Displacement of the moving wall of the mechanical means 18 allows variation in the damper volume 17 of the damper chamber 15. The return spring means acting on the moving wall makes the position of the moving wall that corresponds to a particular damper volume 17 directly dependent on the damping pressure.

In the embodiment of the mechanical means 18 shown in FIG. 5, the piston 19 is acted on by opposite forces due to the damping pressure and the spring 20, the port 21 allowing a variation with no increase in pressure of the volume defined by the damper chamber 15 and the side of the piston 19 opposite that facing the slider 5. Accordingly, the equilibrium of the piston 19 imposes a proportional relationship between the elongation of the spring 20, i.e. the position of the piston 19, and the damping pressure.

In the FIG. 6 embodiment the volume of the composite member 22 varies in accordance with the damping pressure. The damper volume, which is the complement of the volume of the composite member, is therefore directly related to the damping pressure.

In the FIG. 7 embodiment the piston 23 is exposed on one side to the damping pressure and on the other side to the pressure exerted by the volume 25 of neutral gas, the value of this pressure depending directly on the volume 25 occupied by the neutral gas. This volume being the complement of the damper volume, the latter is therefore also directly dependent on the damping pressure. Referring to FIG. 8, the membrane 26 constituting the moving wall of the mechanical means 18 contains a volume 27 of pressurized neutral gas which varies in accordance with the damping pressure exerted on the outside of the membrane. This volume being the complement of the damper volume, the latter is therefore also directly dependent on the damping pressure.

Because the variable damper volume allows fluid transfer with head loss at the calibrated orifice 14 during transient conditions under which the pressure variation in the damper chamber is delayed relative to that in the output chamber 7, the feedback action of the output pressure on the slider 5 in response to a variation in the output pressure is intensified. The feedback action of the output chamber is written:

$Fu = Pu\ Su - Pa\ Sa$ where

Fu is this action,

Pu is the output pressure,

Pa is the damping pressure,

Su is the radial output section, and

Sa is the radial damper section.

The hypothetical action of the output pressure on the slider 5 in the absence of the calibrated orifice 14 is written:

$Fuo = Pu\ (Su-Sa)$ because in this case Pa=Pu

Comparing Fu to Fuo, it is found that:
$Fu - Fuo = (Pu-Pa)\ Sa$

If the output pressure increases:
Pu>Pa so that Fu<Fuo with Fuo>0 so that |Fu|>|Fuo|

If the output pressure decreases
Pu<Pa so that Fu<Fuo with Fuo<0 so that |Fu|>|Fuo|

The feedback action is therefore intensified by the existence of the damper chamber 15 with its variable damper volume 17 and the calibrated orifice 14 feeding this volume with a head loss.

Under such transient conditions, a certain amount of time is required for the output and damping-pressures to equalize through transfer of fluid between the output chamber and the damper chamber via the calibrated orifice 14. This latent time, corresponding to a progressive variation in the damping pressure, prevents excessively fast and sudden return of the slider to its equilibrium position, so reducing the risk of instability of the slider's position.

Another option is for the servo-control pressure, i.e. the pilot pressures I, to vary with the control current and for the slider 5 to move to a position connecting the output port to the feed port or to the return port according to whether the output pressure is less than or greater than the new servo-control pressure. When this connection is made the output pressure in the output chamber and at the output port varies faster than the damping pressure because of the head loss at the calibrated orifice 14. As previously, a latent time is needed for the damping pressure to change progressively towards the output pressure. This progressive variation avoids an excessively sudden return of the slider because, when the output pressure reaches the servo-control pressure, the slider tends to isolate the output port, the output pressure then varying by transfer of fluid between the output chamber and the damper chamber via the calibrated orifice 14 to return the slider 5 to its initial position. The stable return of the slider is effected gently once the output and damping pressures are equal.

The invention is not limited to the embodiments just described and encompasses any variant thereof using equivalent means to obtain the features stated above.

I claim:

1. Pressure-regulating servovalve comprising a distributor body having an output port, a feed port and a return port, and a slider adapted to slide inside the distributor body between a first position isolating the output port from the feed and return ports, a second position connecting the output port to the feed port and a third position connecting the output port to the return port, the slider co-operating with the distributor body to define two pilot chambers fed with a pilot fluid from a pilot unit and an output chamber connected to the output port by an output passage, the servovalve including a damper chamber in the distributor body including mechanical means for reducing its hydraulic stiffness and connected to the output port via a damper passage including a calibrated orifice.

2. Pressure-regulating servovalve according to claim 1 wherein the damper passage is inside the slider.

3. Pressure-regulating servovalve according to claim 1 wherein the damper passage is inside the distributor body.

4. Pressure-regulating servovalve according to claim 1 wherein the mechanical means includes a moving wall and return spring means for said moving wall which defines with the damper chamber a variable damper volume.

5. Pressure-regulating servovalve according to claim 4 wherein the mechanical means comprise a piston adapted to slide in the damper chamber, a return spring urging the piston towards the slider and a port in the distributor body at the end of the damper chamber remote from the slider.

6. Pressure-regulating servovalve according to claim 4 wherein the mechanical means comprise a composite member inside the damper chamber.

7. Pressure-regulating servovalve according to claim 4 wherein the mechanical means comprise a piston having a seal at its periphery and adapted to slide inside the damper chamber and a pressurized neutral gas in the damper chamber on the opposite side of said piston to the slider.

8. Pressure-regulating servovalve according to claim 4 wherein the mechanical means comprise a membrane containing a volume of pressurized neutral gas inside the damper chamber.

* * * * *